(12) United States Patent
Luo

(10) Patent No.: US 11,351,820 B2
(45) Date of Patent: Jun. 7, 2022

(54) TIRE POSITIONING METHOD AND APPARATUS, ELECTRONIC CONTROL UNIT AND TIRE PRESSURE SENSOR

(71) Applicant: AUTEL INTELLIGENT TECHNOLOGY CORP., LTD., Guangdong (CN)

(72) Inventor: Yongliang Luo, Guangdong (CN)

(73) Assignee: AUTEL INTELLIGENT TECHNOLOGY CORP., LTD., Shenzhen (CN)

(*) Notice: Subject to any disclaimer, the term of this patent is extended or adjusted under 35 U.S.C. 154(b) by 25 days.

(21) Appl. No.: 17/022,377

(22) Filed: Sep. 16, 2020

(65) Prior Publication Data

US 2020/0406690 A1 Dec. 31, 2020

Related U.S. Application Data

(63) Continuation of application No. PCT/CN2019/077123, filed on Mar. 6, 2019.

(30) Foreign Application Priority Data

Mar. 16, 2018 (CN) .......................... 2018102170931

(51) Int. Cl.
 *B60C 23/04* (2006.01)
(52) U.S. Cl.
 CPC ...... *B60C 23/0416* (2013.01); *B60C 23/0442* (2013.01); *B60C 23/0447* (2013.01)
(58) Field of Classification Search
 CPC ............ B60C 23/0416; B60C 23/0442; B60C 23/0447; B60C 23/0437; B60C 23/044;
 (Continued)

(56) References Cited

U.S. PATENT DOCUMENTS

| 11,034,196 | B2* | 6/2021 | Stewart | ............... B60C 23/0472 |
| 2002/0003474 | A1* | 1/2002 | McClelland | ........ B60C 23/0413 |
| | | | | 340/442 |

(Continued)

FOREIGN PATENT DOCUMENTS

| CN | 102555697 A | 7/2012 |
| CN | 105150777 A | 12/2015 |

(Continued)

OTHER PUBLICATIONS

First Chinese Office Action dated Apr. 9, 2019; Appln. No. 201810217093.1.

(Continued)

*Primary Examiner* — Eric Blount

(57) ABSTRACT

Embodiments of the present invention relate to the technical field of automobiles and disclose a tire positioning method and apparatus, an electronic control unit (ECU) and a tire pressure sensor. The method includes: successively controlling, within a transmission cycle, one of L exciter sets to send a low-frequency signal, L being an integer greater than 1; receiving high-frequency signals fed back by N tire pressure sensors according to the low-frequency signals, N being an integer greater than 1; determining a correspondence between one of the L exciter sets and M tire pressure sensors according to the high-frequency signals, M being an integer greater than 1; and after a quantity of transmission cycles reaches a preset threshold, determining a tire corresponding to each of the N tire pressure sensors according to the correspondence between the exciter set and the M tire pressure sensors determined in each transmission cycle. The tire positioning method is accurate and reliable.

14 Claims, 6 Drawing Sheets

(58) Field of Classification Search
CPC ............ B60C 23/0444; B60C 23/0462; B60C 23/0422; B60C 23/04
USPC ........................................................ 340/442
See application file for complete search history.

(56) References Cited

U.S. PATENT DOCUMENTS

| | | |
|---|---|---|
| 2005/0151634 A1 | 7/2005 | Tsuji et al. |
| 2008/0224839 A1 | 9/2008 | Costes |
| 2013/0120127 A1* | 5/2013 | Sun .................... B60C 23/0437 340/447 |
| 2017/0158000 A1 | 6/2017 | Wicher et al. |
| 2017/0334253 A1 | 11/2017 | Chuang |
| 2018/0361803 A1* | 12/2018 | Saburi .................... G01L 17/00 |

FOREIGN PATENT DOCUMENTS

| | | |
|---|---|---|
| CN | 205029098 U | 2/2016 |
| CN | 106827975 A | 6/2017 |
| CN | 108501630 A | 9/2018 |
| FR | 2956768 A1 | 8/2011 |

OTHER PUBLICATIONS

International Search Report dated Apr. 30, 2019; PCT/CN2019/077123.
Extended European Search Report dated Dec. 9, 2020; Appln. No. 19767719.8.

* cited by examiner

TIRE POSITIONING METHOD AND APPARATUS, ELECTRONIC CONTROL UNIT AND TIRE PRESSURE SENSOR

This application is a continuation application of International Application No. PCT/CN2019/077123, filed on Mar. 6, 2019, which claims priority of Chinese Patent Application No. 201810217093.1, filed on Mar. 16, 2018, which is incorporated herein by reference in its entirety.

BACKGROUND

Technical Field

The present application relates to the technical field of automobiles, and in particular, to a tire positioning method and apparatus, an electronic control unit (ECU) and a tire pressure sensor.

Related Art

In a tire pressure monitoring system (TPMS), a tire pressure sensor fixed in a tire of an automobile is used to monitor a main parameter such as a pressure and a temperature of the tire of the automobile in real-time during driving or resting to ensure that the pressure and the temperature of the tire are maintained within a standard range, reducing a probability of puncture and destruction, fuel consumption and damage to automobile parts. The TPMS includes a tire pressure sensor installed on each tire, which is configured to collect data such as a pressure and a temperature of an automobile tire in real time and transmit the data to an electronic control device included in the TPMS. The electronic control device may position the tire, so as to monitor a status of the tire based on the data transmitted by the tire pressure sensor corresponding to the tire.

Currently, improving accuracy of tire positioning performed by an electronic control device becomes a research subject for those skilled in the art.

SUMMARY

Embodiments of the present invention provide an accurate tire positioning method and apparatus, an electronic control unit (ECU) and a tire pressure sensor.

Embodiments of the present invention disclose the following technical solutions.

According to a first aspect, an embodiment of the present invention provides a tire positioning method, including:
successively controlling, within a transmission cycle, one of L exciter sets to send a low-frequency signal, L being an integer greater than 1;
receiving high-frequency signals fed back by N tire pressure sensors according to the low-frequency signals, N being an integer greater than 1;
determining a correspondence between one of the L exciter sets and M tire pressure sensors according to the high-frequency signals, M being an integer greater than 1; and
after a quantity of transmission cycles reaches a preset threshold, determining a tire corresponding to each of the N tire pressure sensors according to the correspondence between the exciter set and the M tire pressure sensors determined in each transmission cycle.

In some embodiments, the successively controlling, within a transmission cycle, one of L exciter sets to send a low-frequency signal includes:
controlling, within the transmission cycle, a first exciter set to send a first low-frequency signal; and
controlling L−1 exciter sets to send a second low-frequency signal, where
the L−1 exciter sets include N exciters; and the second low-frequency signal is used to trigger the tire pressure sensor to switch to an active mode.

In some embodiments, position attributes of the first exciter sets within each transmission cycle are different. The position attribute of the first exciter set is determined through a same position attribute of exciters included in the first exciter set.

In some embodiments, the receiving high-frequency signals fed back by N tire pressure sensors according to the low-frequency signals includes:
receiving N high-frequency signals fed back by the N tire pressure sensors in an active state.

In some embodiments, the determining a correspondence between one of the L exciter sets and M tire pressure sensors according to the high-frequency signals includes:
determining M high-frequency signals corresponding to the first exciter set in the N high-frequency signals; and
determining that the first exciter set corresponds to the M tire pressure sensors sending the M high-frequency signals.

In some embodiments, the determining M high-frequency signals corresponding to the first exciter set in the N high-frequency signals includes:
determining whether a byte related to the first low-frequency signal in the high-frequency signal has changed; and
if the byte related to the first low-frequency signal in the high-frequency signal has changed, determining that the high-frequency signal corresponds to the first exciter set.

In some embodiments, the byte is used to accumulate a quantity of received frames of the first low-frequency signal received by the tire pressure sensor.

In some embodiments, the method further includes:
determining whether the high-frequency signal is valid.

The determining whether a byte related to the first low-frequency signal in the high-frequency signal has changed includes:
if the high-frequency signal is valid, determining whether the byte related to the first low-frequency signal in the high-frequency signal has changed.

In some embodiments, the determining whether the high-frequency signal is valid includes:
determining, according to the high-frequency signal, a latest quantity of received frames of the first low-frequency signal of the tire pressure sensor sending the high-frequency signal;
determining whether a ratio of the quantity of received frames to a quantity of sent frames of the first low-frequency signal is greater than or equal to a preset ratio threshold; and
if the ratio of the quantity of received frames to the quantity of sent frames of the first low-frequency signal is greater than or equal to the preset ratio threshold, determining that the high-frequency signal is valid.

In some embodiments, the successively controlling, within a transmission cycle, one of L exciter sets to send a low-frequency signal includes:
when a trigger condition is met, successively controlling, within the transmission cycle, the one of the L exciter sets to send the low-frequency signal.

In some embodiments, the trigger condition includes the following:
a detected driving speed of a vehicle is greater than or equal to a preset speed threshold; or a detected stopping duration of a vehicle is greater than or equal to a preset time threshold; or a trigger signal input by a user is detected.

In some embodiments, after the successively controlling, within a transmission cycle, one of L exciter sets to send a low-frequency signal, the method further includes:

if J high-frequency signals are received within a preset time period, determining that a tire corresponding to a tire pressure sensor sending the J high-frequency signals is a spare tire, where J is a positive integer.

In some embodiments, the method further includes:

determining whether the J high-frequency signals are sent by the tire pressure sensor in a conventional mode, where the determining that a tire corresponding to a tire pressure sensor sending the J high-frequency signals is a spare tire includes:

if the J high-frequency signals are sent by the tire pressure sensor in the conventional mode, determining that the tire corresponding to the tire pressure sensor sending the J high-frequency signals is a spare tire.

According to a second aspect, an embodiment of the present invention provides a tire positioning method, including:

receiving a low-frequency signal sent by an exciter; and feeding back a high-frequency signal to an ECU for a tire pressure according to the low-frequency signal, the high-frequency signal being used by the ECU for the tire pressure to determine a tire corresponding to a tire pressure sensor.

In some embodiments, the method further includes:

presetting a delay time; and delaying feedback of the high-frequency signal according to the delay time.

According to a third aspect, an embodiment of the present invention provides a tire positioning apparatus, including:

a low-frequency signal sending module, configured to successively control, within a transmission cycle, one of L exciter sets to send a low-frequency signal, L being an integer greater than 1;

a high-frequency signal receiving module, configured to receive high-frequency signals fed back by N tire pressure sensors according to the low-frequency signals, N being an integer greater than 1;

a first determining module, configured to determine a correspondence between one of the L exciter sets and M tire pressure sensors according to the high-frequency signals, M being an integer greater than 1; and a second determining module, configured to: after a quantity of transmission cycles reaches a preset threshold, determine a tire corresponding to each of the N tire pressure sensors according to the correspondence between the exciter set and the M tire pressure sensors determined in each transmission cycle.

In some embodiments, the low-frequency signal sending module includes:

a first low-frequency signal sending module, configured to control, within the transmission cycle, a first exciter set to send a first low-frequency signal; and a second low-frequency signal sending module, configured to control L−1 exciter sets to send a second low-frequency signal, where the L−1 exciter sets include N exciters; and the second low-frequency signal is used to trigger the tire pressure sensor to switch to an active mode.

In some embodiments, position attributes of the first exciter sets within each transmission cycle are different. The position attribute of the first exciter set is determined through a same position attribute of exciters included in the first exciter set.

In some embodiments, the high-frequency signal receiving module is specifically configured to:

receive N high-frequency signals fed back by the N tire pressure sensors in an active state.

In some embodiments, the first determining module is specifically configured to:

determine M high-frequency signals corresponding to the first exciter set in the N high-frequency signals; and determine that the first exciter set corresponds to the M tire pressure sensors sending the M high-frequency signals.

In some embodiments, that the first determining module determines M high-frequency signals corresponding to the first exciter set in the N high-frequency signals includes:

determining whether a byte related to the first low-frequency signal in the high-frequency signal has changed; and if the byte related to the first low-frequency signal in the high-frequency signal has changed, determining that the high-frequency signal corresponds to the first exciter set.

In some embodiments, the byte is used to accumulate a quantity of received frames of the first low-frequency signal received by the tire pressure sensor.

In some embodiments, the apparatus further includes:

a judging module, configured to determine whether the high-frequency signal is valid; where that the first determining module determines whether a byte related to the first low-frequency signal in the high-frequency signal changes includes:

if the judging module determines that the high-frequency signal is valid, determining whether the byte related to the first low-frequency signal in the high-frequency signal has changed.

In some embodiments, the judging module is specifically configured to:

determine, according to the high-frequency signal, a latest quantity of received frames of the first low-frequency signal of the tire pressure sensor sending the high-frequency signal;

determine whether a ratio of the quantity of received frames to a quantity of sent frames of the first low-frequency signal is greater than or equal to a preset ratio threshold; and if the ratio of the quantity of received frames to the quantity of sent frames of the first low-frequency signal is greater than or equal to the preset ratio threshold, determine that the high-frequency signal is valid.

In some embodiments, the low-frequency signal sending module is specifically configured to:

when a trigger condition is met, successively control, within the transmission cycle, the one of the L exciter sets to send the low-frequency signal.

In some embodiments, the trigger condition includes the following:

a detected driving speed of a vehicle is greater than or equal to a preset speed threshold; or a detected stopping duration of a vehicle is greater than or equal to a preset time threshold; or a trigger signal input by a user is detected.

In some embodiments, the apparatus further includes:

a third determining module, configured to: if J high-frequency signals are received within a preset time period, determine that a tire corresponding to a tire pressure sensor sending the J high-frequency signals is a spare tire, where J is a positive integer.

In some embodiments, the apparatus further includes:

a fourth determining module, configured to determine whether the J high-frequency signals are sent by the tire pressure sensor in a conventional mode; where that the third determining module determines that a tire corresponding to a tire pressure sensor sending the J high-frequency signals is a spare tire includes:

if the fourth determining module determines that the J high-frequency signals are sent by the tire pressure sensor in the conventional mode, determining that the tire corresponding to the tire pressure sensor sending the J high-frequency signals is a spare tire.

According to a fourth aspect, an embodiment of the present invention provides a tire positioning apparatus, including:

a low-frequency signal receiving module, configured to receive a low-frequency signal sent by an exciter; and a feedback module, configured to feed back a high-frequency signal to an electronic control unit (ECU) for a tire pressure according to the low-frequency signal, the high-frequency signal being used by the ECU for the tire pressure to determine a tire corresponding to a tire pressure sensor.

In some embodiments, the apparatus further includes:

a presetting module, configured to preset a delay time; and a delay module, configured to delay a feedback of the high-frequency signal according to the delay time.

According to a fifth aspect, an embodiment of the present invention provides an electronic control unit (ECU), including:

at least one processor; and a memory, communicatively connected to the at least one processor, where the memory stores an instruction executable by the at least one processor; and the at least one processor is configured to execute the instruction to implement the foregoing tire positioning method.

According to a sixth aspect, an embodiment of the present invention provides a tire pressure sensor, including:

at least one processor; and a memory, communicatively connected to the at least one processor, where the memory stores an instruction executable by the at least one processor; and the at least one processor is configured to execute the instruction to implement the foregoing tire positioning method.

According to a seventh aspect, an embodiment of the present invention provides a tire pressure monitoring system, an electronic control unit (ECU) and a tire pressure sensor.

The ECU is connected to the tire pressure sensor.

The ECU is configured to perform the foregoing tire positioning method.

The tire pressure sensor is configured to perform the foregoing tire positioning method.

In the embodiments of the present invention, one of the L exciter sets is successively controlled within a transmission cycle to send the low-frequency signal, the high-frequency signals fed back by the N tire pressure sensors according to the low-frequency signals are received, the correspondence between one of the L exciter sets and the M tire pressure sensors may be determined according to the high-frequency signals, and after a quantity of the transmission cycles reaches the preset threshold, the tire corresponding to each of the N tire pressure sensors is determined according to the correspondence between the exciter set and the M tire pressure sensors determined in each transmission cycle. In the foregoing manner, tire positioning accuracy can be improved.

DETAILED DESCRIPTION

To make the objectives, technical solutions, and advantages of embodiments of the present invention clearer and more comprehensible, the following further describes the technical solutions in the embodiments of the present invention in detail with reference to the accompanying drawings in the embodiments of the present invention. Apparently, the described embodiments are merely some rather than all of the embodiments of the present invention. All other embodiments obtained by one of ordinary skill in the art based on the embodiments of the present invention without creative efforts shall fall within the protection scope of the present invention.

In addition, the implementations of the present invention and characteristics of the implementations may be randomly combined with each other provided that there is no conflict.

A tire pressure monitoring system automatically monitors various statuses of a tire in real time through a tire pressure sensor installed in the tire, thereby providing effective safety guarantee for driving. However, tire positioning is inefficient and inaccurate. Based on this, the embodiments of the present invention provide a tire positioning method and apparatus, an ECU and a tire pressure sensor. The tire positioning method may be applied to various vehicles with tires. The present invention is described below using an automobile as an example of the vehicle. Tire positioning is to determine a tire corresponding to each of tire pressure sensors, that is, to determine a tire to which received information of a tire pressure sensor belongs, so that a user can obtain a tire pressure value of each tire in real time, such as a pressure, a temperature and other data of each tire. Generally, tire positioning is mainly positioning of left front, right front, left rear and right rear tires of an automobile. For some automobile with a spare tire, tire positioning may further include positioning of the spare tire.

Figure 1:
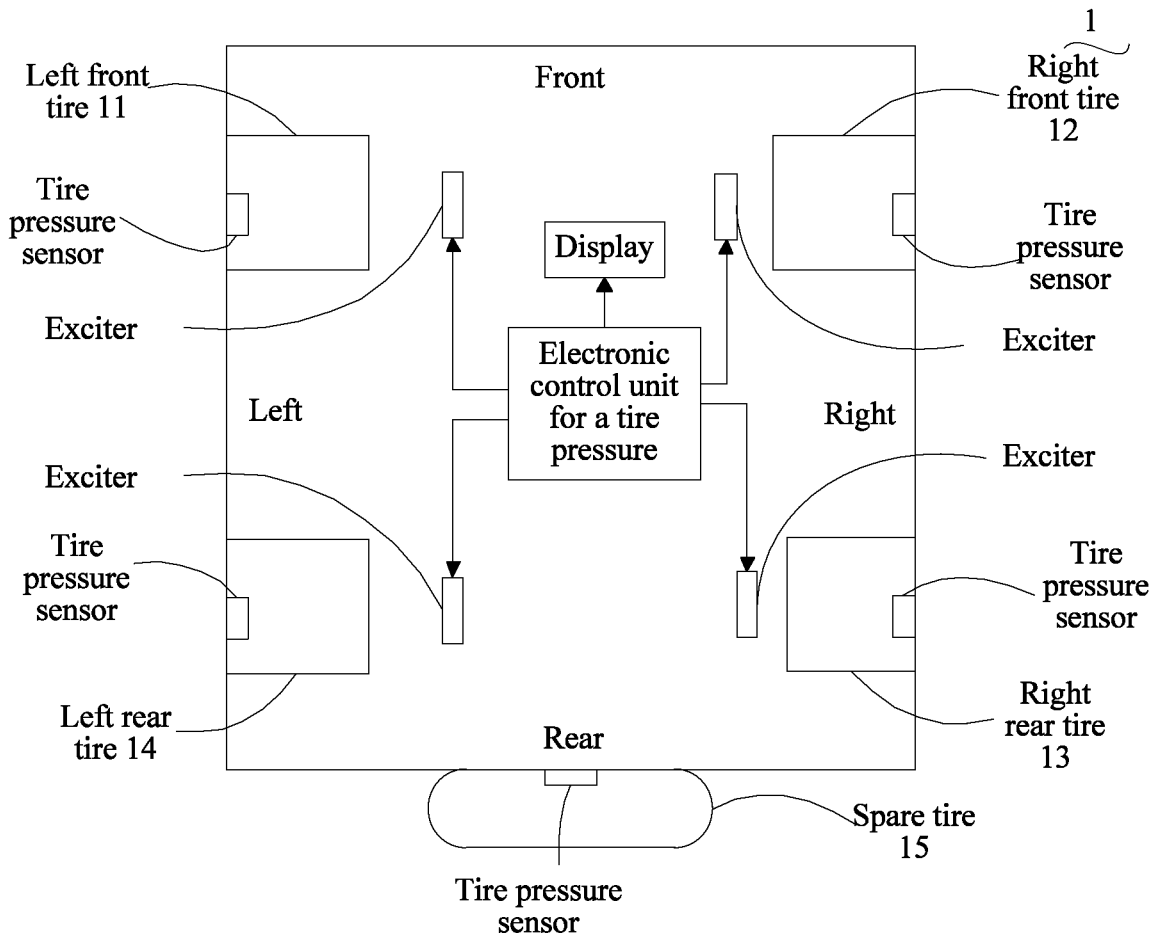
FIG. 1 is a schematic diagram of an application environment of a tire positioning method according to an embodiment of the present invention.

FIG. 1 is a schematic diagram of an application environment of a tire positioning method according to an embodiment of the present invention. As shown in FIG. 1, the application environment includes an automobile 1. The automobile 1 includes a left front tire 11, a right front tire 12, a right rear tire 13, a left rear tire 14, a spare tire 15 and a TPMS. The TPMS includes an electronic control unit (ECU) for a tire pressure, a plurality of exciters, a plurality of tire pressure sensors and a display (such as a tire pressure meter display). The TPMS is described in detail below through that the TPMS includes four exciters and five tire pressure sensors as an example. It may be understood that, in some other embodiments, there may be other suitable quantities of exciters and tire pressure sensors, that is, specific quantities thereof are not limited.

The four exciters may be any exciters capable of transmitting a low-frequency signal. The four exciters are respectively installed near the left front, right front, left rear and right rear tires.

Specifically, an exciter is disposed near the left front tire 11. The exciter is defined as a left front exciter TPMI1. An exciter is disposed near the right front tire 12. The exciter is defined as a right front exciter TPMI2. An exciter is disposed near the right rear tire 13. The exciter is defined as a right rear exciter TPMI3. An exciter is disposed near the left rear tire 14. The exciter is defined as a left rear exciter TPMI4.

The exciters share a synchronization clock, and are connected to the ECU in a wired manner through a plurality of selector switches, so that the ECU controls the exciter to send an excitation signal through the plurality of selector switches, for example, send a low-frequency signal.

According to a position attribute of the exciter, the exciters with a same position attribute may be classified into one exciter set. The position attribute is used to indicate a relative position at which the exciter is installed. For example, if the TPMI1 is installed close at a position near the left front tire 11, position attribute of TMPI1 includes two attributes: left and front. Therefore, based on the position attribute, four exciter sets may form four exciter sets:

(1) an exciter set with a left attribute, including the left front exciter TPMI1 and the left rear exciter TPMI4;

(2) an exciter set with a right attribute, including the right front exciter TPMI2 and the left rear exciter TPMI3;

(3) an exciter set with a front attribute, including the left front exciter TPMI1 and the right front exciter TPMI2; and (4) an exciter set with a rear attribute, including the right rear exciter TPMI3 and the left rear exciter TPMI4.

The ECU may control, through the plurality of selector switches, a plurality of exciter sets to simultaneously send low-frequency signals, that is, the ECU may control the exciter set with the left attribute to send a low-frequency signal, control the exciter set with the right attribute to send a low-frequency signal, control the exciter set with the front attribute to send a low-frequency signal and control the exciter set with the rear attribute to send a low-frequency signal.

A duration for completing sending of the low-frequency signal through a combination of any three of the four manners is defined as one transmission cycle. The low-frequency signal may include a first low-frequency signal or a second low-frequency signal. The first low-frequency signal LF1 is used for counting, and the second low-frequency signal LF2 is used to trigger the tire pressure sensor to switch to an active mode.

It may be understood that, in an actual case, the spare tire 15 cannot receive the low-frequency signal due to shielding by metal such as a trunk. Therefore, it is meaningless to install an exciter near the spare tire 15. Therefore, positioning of the spare tire does not require excitation of an exciter, that is, the application environment needs to include only four exciters.

Four of the five tire pressure sensors are built in the left front, right front, left rear and right rear tires, respectively, and the other tire pressure sensor is built in the spare tire 15.

Specifically, a tire pressure sensor is built in each tire. In addition, each tire pressure sensor is communicatively connected to the ECU to communicate with the ECU. The tire pressure sensor may be communicatively connected to the ECU in a wireless manner through wireless communications technologies. Each tire pressure sensor built in the left front, right front, left rear and right rear tires is further communicatively connected to the exciter to communicate with the exciter.

For example, high-frequency signals fed back by N tire pressure sensors according to the low-frequency signal are received. N is an integer greater than 1. In other words, the four tire pressure sensors receive a low-frequency signal sent by the exciter, and feed back a high-frequency signal to the ECU according to the low-frequency signal. For the LF1, the tire pressure sensor merely counts a signal quantity of received frames, and does not feed back a high-frequency signal. For the LF2, the tire pressure sensor feeds back a high-frequency signal so that the ECU positions the left front, right front, left rear and right rear tires. In addition, a remaining one of the five tire pressure sensors is built in the spare tire 15 so that the ECU determines a tire corresponding to the spare tire 15 according to the high-frequency signal sent by the tire pressure sensor.

The ECU can be any suitable type of ECU with a specific logic operation capability and a function and capable of positioning a tire. This may be implemented by an ECU in an automobile or by an ECU independent of an automobile system. No limitation is imposed herein. The ECU is connected to the four exciters respectively through the plurality of selector switches to control the exciter to send a low-frequency signal. The ECU is communicatively connected to the five tire pressure sensors, for example, is communicatively connected to the five tire pressure sensors through a wireless communication module of the ECU. The ECU is connected to the tire pressure meter display to send, to the tire pressure meter display, tire detection information, such as data corresponding to a pressure and a temperature of each tire.

The tire pressure meter display may be any display having a display function. The tire pressure meter display is connected to the ECU through a bus, etc., so as to visually display, to the user, a tire pressure value corresponding to each tire, such as the pressure, the temperature and other data of each tire obtained by the ECU.

It may be understood that the naming of each component of the automobile 1 is merely for identification, and should not be understood as a limitation on the embodiments of the present invention.

It should be noted that the tire positioning method provided in the embodiments of the present invention may be further extended to other suitable application environments without being limited to the application environment shown in FIG. 1, which shall not be understood as a limitation on the embodiments of the present invention. Although FIG. 1 shows only five tires, four exciters, five tire pressure sensors, one display and one ECU, those skilled in the art may understand that during actual application, the application environment may further include more or fewer tires, exciters, tire pressure sensors, displays and ECUs.

Embodiment 1

Figure 2:
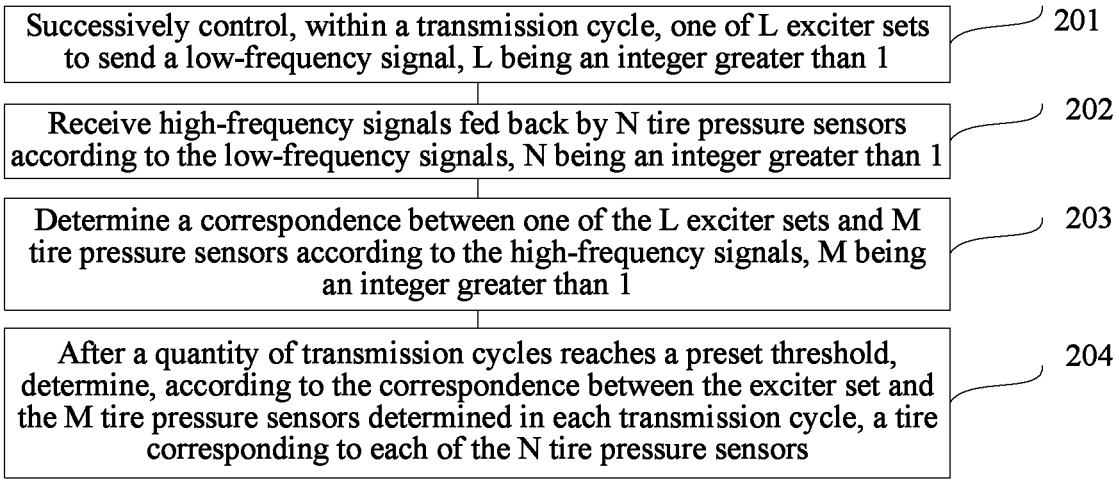
FIG. 2 is a schematic flowchart of a tire positioning method according to an embodiment of the present invention.

FIG. 2 is a schematic flowchart of a tire positioning method according to an embodiment of the present invention. The tire positioning method in this embodiment of the present invention may be performed by the ECU in the foregoing automobile 1, and the method may also be performed by an ECU in other vehicles. No limitation is imposed herein.

Referring to FIG. 2, the tire positioning method includes the following steps.

201: Successively control, within a transmission cycle, one of L exciter sets to send a low-frequency signal, L being an integer greater than 1.

In this embodiment of the present invention, one exciter set includes at least two exciters with a same position attribute. The position attribute is used to indicate a relative position at which the exciter is installed.

As shown in FIG. 1, a position attribute of the left front exciter TPMI1 installed near the left front tire 11 includes a left attribute and a front attribute.

A position attribute of the right front exciter TPMI2 installed near the right front tire 12 includes a right attribute and a front attribute.

A position attribute of the right rear exciter TPMI3 installed near the right rear tire 13 includes a right attribute and a rear attribute.

A position attribute of the left rear exciter TPMI4 installed near the left rear tire 14 includes a left attribute and a rear attribute.

Therefore, the left front exciter TPMI1 and the left rear exciter TPMI4 form an exciter set having a left attribute.

The right front exciter TPMI2 and the right rear exciter TPMI3 form an exciter set having a right attribute.

The left front exciter TPMI1 and the right front exciter TPMI2 form an exciter set having a front attribute.

The right rear exciter TPMI3 and the left rear exciter TPMI4 form an exciter set having a rear attribute.

A low-frequency signal sent by each exciter set may be a first low-frequency signal or a second low-frequency signal.

The first low-frequency signal is mainly used for counting, and the tire pressure sensor does not feed back a high-frequency signal after receiving the first low-frequency signal.

The first low-frequency signal may have a sequence format including two bytes of data: A and C. A quantity of sent frames of each first low-frequency signal is N1, N1 being a number between Nx and Ny that is randomly set. For example, when the lower limit Nx is set to 10 and the upper limit Ny is set to 80, N1 may be a random number between 10 and 80. For example, N1=20, etc.

The second low-frequency signal is mainly used to trigger the tire pressure sensor to switch to an active mode, so as to ensure that a corresponding tire pressure sensor can feed back a high-frequency signal. The second low-frequency signal may have a sequence format including three bytes of data: A, B and X. A quantity of sent frames of each second low-frequency signal is N2, N2 being a fixed value that needs to ensure that a corresponding tire pressure sensor can be activated. For example, N2=50 is set. A and C are fixed numbers, for example, numbers preset in the ECU. B and X are variable random numbers, for example, numbers generated randomly in the ECU.

That the ECU the successively controls, within a transmission cycle, one of L exciter sets to send a low-frequency signal includes:

controlling, within the transmission cycle, a first exciter set to send a first low-frequency signal; and controlling L−1 exciter sets to send a second low-frequency signal.

The L−1 exciter sets include N exciters. The second low-frequency signal is used to trigger the tire pressure sensor to switch to an active mode. N is an integer greater than 1.

In this embodiment of the present invention, the exciters included in the L−1 exciter sets correspond to tire pressure sensors built in left front, right front, left rear and right rear tires, respectively, to ensure that each exciter included in the L−1 exciter sets can trigger a corresponding tire pressure sensor to switch to the active mode. In other words, a quantity of tire pressure sensors built in the left front, right front, left rear and right rear tires is equal to the quantity of the exciters included in the L−1 exciter set, which are both N.

As shown in FIG. 1, there are four tire pressure sensors, that is, the L−1 exciter set includes four exciters. For the automobile shown in FIG. 1, one exciter set includes two exciters. Therefore, for the automobile shown in FIG. 1, L may be 3.

A transmission cycle is a duration required for each of the L exciter sets to complete sending of a low-frequency signal. When L=3, for the four exciters in FIG. 1, four exciter sets may be formed. A duration for completing sending of the low-frequency signal through a combination of any three of the four exciters is defined as one transmission cycle. Therefore, the ECU successively controls, within the transmission cycle, one of the three exciter sets to send a low-frequency signal. For example, the ECU successively controls the exciter set with the left attribute to send a low-frequency signal, controls the exciter set with the front attribute to send a low-frequency signal and controls the exciter set with the rear attribute to send a low-frequency signal.

Position attributes of the first exciter sets within each transmission cycle are different. The position attribute of the first exciter set is determined through a same position attribute of exciters included in the first exciter set.

Figure 3:
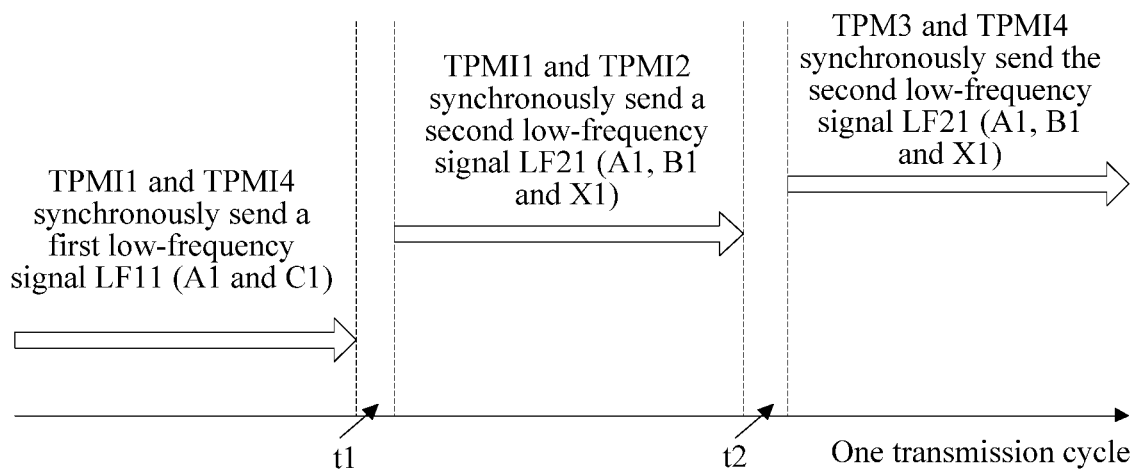
FIG. 3 is a schematic diagram of successively controlling, within a transmission cycle, one of L exciter sets to send a low-frequency signal according to an embodiment of the present invention.

As shown in FIG. 3, in one transmission cycle, the exciter set with the left attribute is a first exciter set. In this case, in the cycle, the ECU controls the TPMI1 and the TPMI4 in the exciter set with the left attribute to synchronously send a first low-frequency signal LF11 (A1 and C1). A quantity of sent frames of the first low-frequency signal LF11 is N11.

Then the ECU controls the TPMI1 and the TPMI2 in the exciter set with the front attribute to synchronously send a second low-frequency signal LF21 (A1, B1 and X1).

The ECU then controls the TPMI3 and the TPMI4 in the exciter set with the rear attribute to synchronously send the second low-frequency signal LF21 (A1, B1 and X1).

Optionally, there may be a preset time interval between sending of the low-frequency signal by the exciter sets. For example, the ECU controls the exciter set with the left attribute to send the LF11, and then controls, after a preset time t1, the exciter set with the front attribute to send the second low-frequency signal LF21 and then controls, after a preset time t2, the exciter set with the rear attribute to send the second low-frequency signal LF21, so as to avoid overlapping data.

Similarly, in another transmission case, in the cycle, the exciter set with the right attribute is a first exciter set. In this cycle, the ECU controls the TPMI2 and the TPMI3 in the exciter set with the right attribute to synchronously send a first low-frequency signal LF12 (A2 and C2). A quantity of sent frames of the first low-frequency signal LF12 is N12.

Then the ECU controls the TPMI1 and the TPMI2 in the exciter set with the front attribute to synchronously send a second low-frequency signal LF22 (A2, B2 and X2).

The ECU then controls the TPMI3 and the TPMI4 in the exciter set with the rear attribute to synchronously send the second low-frequency signal LF22 (A2, B2 and X2).

Alternatively, the exciter set with the front attribute is a first exciter set. In this case, in the cycle, the ECU controls the TPMI1 and the TPMI2 in the exciter set with the front attribute to synchronously send a first low-frequency signal LF13 (A3 and C3). A quantity of sent frames of the first low-frequency signal LF13 is N13.

Then the ECU controls the TPMI1 and the TPMI4 in the exciter set with the left attribute to synchronously send a second low-frequency signal LF23 (A3, B3 and X3).

The ECU then controls the TPMI2 and the TPMI3 in the exciter set with the right attribute to synchronously send the second low-frequency signal LF23 (A3, B3 and X3).

In some embodiments, to reduce unnecessary power consumption, a condition for triggering sending of a low-frequency signal may be set.

Specifically, the successively controlling, within a transmission cycle, one of L exciter sets to send a low-frequency signal includes: when a trigger condition is met, successively controlling, within the transmission cycle, the one of the L exciter sets to send the low-frequency signal.

The trigger condition includes the following: a detected driving speed of a vehicle (such as an automobile) is greater than or equal to a preset speed threshold, where the preset speed threshold may be set according to a driving habit of a user; or a detected stopping duration of a vehicle is greater than or equal to a preset time threshold, where the preset time threshold may be set according to a driving habit of a user, and detection needs to be performed only once a day; or a trigger signal input by a user is detected. During transposition of a tire pressure sensor or a tire, the trigger signal input by the user can be detected in real time.

202: Receive high-frequency signals fed back by N tire pressure sensors according to the low-frequency signals, N being an integer greater than 1.

In this embodiment, for the first low-frequency signal LF1, the tire pressure sensor merely counts a quantity of received frames of a signal, and does not feed back a high-frequency signal. For the second low-frequency signal LF2, the tire pressure sensor is triggered to switch to the active mode, so that the tire pressure sensor returns data in a specific format to generate a high-frequency signal, and then sends the high-frequency signal to the ECU for positioning. Therefore, that the ECU receives high-frequency signals fed back by N tire pressure sensors according to the low-frequency signals specifically includes: receiving N high-frequency signals fed back by the N tire pressure sensors in an active state. For an automobile including four tires, that is, a left front tire, a right front tire, a left rear tire and a right rear tire, each tire has a tire pressure sensor built therein. Therefore, there are four tire pressure sensors for positioning the left front, right front, left rear and right rear tires, that is, N=4.

To position the left front, right front, left rear and right rear tires, the high-frequency signal includes the following information: a sensor identification code: ID; a sensor status byte: S; a pressure byte: P; a temperature byte: T; and a check code CC.

Main functions of some bytes are described below.

The sensor status byte S is used to indicate whether the tire pressure sensor is activated. A status word in a conventional mode is D, and a status word existing when the tire pressure sensor is activated at a low frequency is E; where D is a fixed number, and E meets the following formula: E=E0+(B & 0x0F). E0 is a fixed number, B is a second byte in the second low-frequency signal LF2. 0x0F is hexadecimal data, and is 15 after decimalism conversion, and is 1111 after binary conversion. & is used as a logical AND operator.

The pressure byte P indicates an actual pressure value detected by the tire pressure sensor in the conventional mode. When the tire pressure sensor is in a low-frequency active state, P=X. In other words, when the tire pressure sensor is activated at a low frequency, the pressure byte is equal to data of a third byte in the second low-frequency signal LF2 received by the tire pressure sensor.

The temperature byte T indicates actual temperature information detected by the tire pressure sensor in the conventional mode. After the tire pressure sensor receives the first low-frequency signal LF1, a quantity Nc of frames received currently is recorded. In this case, the temperature byte indicates an accumulative quantity Ns of frames of the LF1 received, and Ns meets the following requirements: T=Ns=Nc+N0. N0 is an accumulative quantity of frames of the LF1 last received by the tire pressure sensor. If no LF1 is received between twice the LF2 is received, the temperature byte is not accumulated. After the LF2 is activated, that is, the tire pressure sensor sends a value of the temperature byte, for example, if an accumulative quantity of frames of the LF1 received by the tire pressure sensor previously is 12, and a quantity of frames of the LF1 received currently is 10, the temperature byte T=12+10=22 at a next time of LF2 excitation.

203: Determine a correspondence between one of the L exciter sets and M tire pressure sensors according to the high-frequency signals, M being an integer greater than 1.

Where the determining a correspondence between one of the L exciter sets and M tire pressure sensors according to the high-frequency signals includes: determining M high-frequency signals corresponding to the first exciter set in the N high-frequency signals; and determining that the first exciter set corresponds to the M tire pressure sensors sending the M high-frequency signals.

Further, the determining M high-frequency signals corresponding to the first exciter set in the N high-frequency signals includes: determining whether a byte related to the first low-frequency signal in the high-frequency signal has changed; and if the byte related to the first low-frequency signal in the high-frequency signal has changed, determining that the high-frequency signal corresponds to the first exciter set. The byte is used to accumulate a quantity of received frames of the first low-frequency signal received by the tire pressure sensor.

Determining M high-frequency signals corresponding to the first exciter set in the N high-frequency signals is described in detail through tire positioning (positioning of a left tire, a right tire, a front tire and a rear tire) of the automobile in FIG. 1. The automobile includes an ECU, four exciters, a left front tire, a right front tire, a left rear tire, a right rear tire and tire pressure sensors built in each tire (that is, there are totally four tire pressure sensors). In this case, L is 3, N is 4 and M is 2.

Left tire positioning:

During a transmission cycle in which the exciter set with the left attribute is used as the first exciter set, the ECU selects the exciter sets (including the TPMI1 and the TPMI4) with the left attribute through a plurality of selector switches, and controls the TPMI1 and the TPMI4 to synchronously send the first low-frequency signal LF11 (A1 and C1), and tire pressure sensors corresponding to the TPMI1 and the TPMI4 record a quantity of frames of the LF11 received currently, for example, N8 and N9 respectively. Then after a preset time t1, the ECU selects the exciter sets (including the TPMI1 and the TPMI2) with the front attribute through a plurality of selector switches, and controls the TPMI1 and the TPMI2 to synchronously send the LF21 (A1, B1 and X1). Then after a preset time t2, the ECU selects the exciter sets (including the TPMI3 and the TPMI4) with the rear attribute through a plurality of selector switches, and controls the TPMI3 and the TPMI4 to synchronously send the LF21 (A1, B1 and X1).

In this case, the ECU receives four high-frequency signals fed back by the four tire pressure sensors according to the low-frequency signals in an active state: (1) a sensor identification code: ID1, a sensor status byte: E1, a pressure byte: P1, a temperature byte: T1 and a check code CC1, where E1=E0+(B1 & 0x0F); P1=X1, T1=N3+N8, N3 being an initial accumulative quantity of times the tire pressure sensor receives the first low-frequency signal LF1 and N8 being a quantity of frames of the first low-frequency signal LF11 received; (2) a sensor identification code: ID4, a sensor status byte: E4, a pressure byte: P4, a temperature byte: T4 and a check code CC4, where E4=E0+(B1 & 0x0F), P4=X1, T4=N6+N9, N6 being initial accumulative quantity of times the tire pressure sensor receives the first low-frequency signal LF1 and N9 being a quantity of frames of the first low-frequency signal LF11 received; (3) a sensor identification code: ID2, a sensor status byte: E2, a pressure byte: P2, a temperature byte: T2 and a check code CC2, where E2=E0+(B1 & 0x0F), P2=X1, T2=T12, T12 being an initial accumulative quantity of times the tire pressure sensor receives the first low-frequency signal LF1; and (4) a sensor identification code: ID3, a sensor status byte: E3, a pressure byte: P3, a temperature byte: T3 and a check code CC3, where E3=E0+(B1 & 0x0F), P3=X1, T3=T13, T12 being an initial accumulative quantity of times the tire pressure sensor receives the first low-frequency signal LF1.

Therefore, based on the status word bytes E1, E2, E3 and E4 and the pressure bytes P1, P2, P3 and P4 in the high-frequency signals, it can be learned that the four tire pressure sensors built in the left front tire, the right front tire, the left rear tire and the right rear tire all have been activated by the second low-frequency signal LF21, and based on bytes related to the first low-frequency signal LF11 in the high-frequency signal, that is, the temperature bytes T1 and T4, it can be learned that both T1 and T4 change, indicating that tire pressure sensors corresponding to the temperature bytes are excited by a low frequency from the first low-frequency signal LF11. However, neither the temperature byte T2 nor the temperature byte T3 changes, indicating that tire pressure sensor are not excited by the low frequency from the first low-frequency signal LF11. So far, left tire positioning (the left front tire and the left rear tire) is completed, that is, correspondences between the first exciter set and the left front tire and the left rear tire in the transmission cycle are determined Right tire positioning, front tire positioning and rear tire positioning:

It may be understood that right tire positioning (the TPMI2 and the TPMI3 are selected, and are controlled to synchronously send the LF12; after t1, the TPMI1 and the TPMI2 are then selected, and are controlled to synchronously send the LF22 and after t2, the TPMI3 and the TPMI4 are selected, and are controlled to synchronously send the LF22), front tire positioning (the TPMI1 and the TPMI2 are selected, and are controlled to synchronously send the LF12; after t1, the TPMI1 and the TPMI4 are then selected, and are controlled to synchronously send the LF22 and after t2, the TPMI2 and the TPMI3 are selected, and are controlled to synchronously send the LF22) and rear tire positioning (the TPMI3 and the TPMI4 are selected, and are controlled to synchronously send the LF12; after t1, the TPMI1 and the TPMI4 are then selected, and are controlled to synchronously send the LF22 and after t2, the TPMI2 and the TPMI3 are selected, and are controlled to synchronously send the LF22) are similar to left tire positioning in principles, and therefore details are not described herein again.

Therefore, it may be determined through left tire positioning that the first exciter set with the left attribute corresponds to the left front tire and the left rear tire. It may be determined through right tire positioning that the first exciter set with the right attribute corresponds to the right front tire and the right rear tire. It may be determined through front tire positioning that the first exciter set with the front attribute corresponds to the left front tire and the right front tire. It may be determined through rear tire positioning that the first exciter set with the rear attribute corresponds to the left rear tire and the right rear tire.

204: After a quantity of transmission cycles reaches a preset threshold, determine, according to the correspondence between the exciter set and the M tire pressure sensors determined in each transmission cycle, a tire corresponding to each of the N tire pressure sensors.

During positioning of the left front, right front, left rear and right rear tires, as long as three tires in the left front, right front, left rear and right rear tires are determined, the remaining one is obviously also determined. Therefore, to improve positioning efficiency, for the automobile in FIG. 1, when a quantity of the transmission cycles reaches 3, a tire corresponding to each of the N tire pressure sensors is determined according to the correspondence between the exciter set and the M tire pressure sensors determined in each transmission cycle, thereby completing tire positioning, that is, a tire to which received information of a tire pressure sensor belongs is determined. For example, first, a transmission cycle of the exciter set with the left attribute as the first exciter set is used for implementing left tire positioning. Then a transmission cycle of the exciter set with the right attribute as the first exciter set is used for implementing right tire positioning. Finally, a transmission cycle of the exciter set with the front attribute as the first exciter set is used for implementing front tire positioning, thereby implementing positioning of the left front, right front, left rear and right rear tires.

In some embodiments, to further improve the positioning efficiency, when the quantity of the transmission cycles reaches 2, the tire corresponding to each of the N tire pressure sensors is determined according to the correspondence between the exciter set and the M tire pressure sensors determined in each transmission cycle, thereby implementing tire positioning. First, a transmission cycle of the exciter set with the left attribute as the first exciter set is used for implementing left tire positioning. Then a transmission cycle of the exciter set with the front attribute as the first exciter set is used for implementing front tire positioning. A temperature byte of the left front tire changes in both of the two transmission cycles. A temperature byte of the left rear tire changes in a first transmission cycle but does not change in a second transmission cycle. A temperature byte of the right front tire does not change in the first transmission cycle but changes in the second transmission cycle. A temperature byte of the right rear tire changes in neither of the two transmission cycles. Thus, positioning of the left front, right front, left rear and right rear tires is completed.

In this embodiment of the present invention, the correspondence between one of the L exciter sets and the M tire pressure sensors is determined through the high-frequency signal. Based on the correspondence between the exciter sets and the M tire pressure sensors determined in each transmission cycle, and because a correspondence between an exciter in each of the L exciter sets and a tire is predetermined, a tire corresponding to each of the N tire pressure sensors is determined to complete tire positioning, thereby improving positioning efficiency and accuracy. In addition, in a process of completing the tire positioning, neither an additional communication device nor manpower is required to enter an identification code of the tire pressure sensor corresponding to the tire.

Embodiment 2

Figure 4:
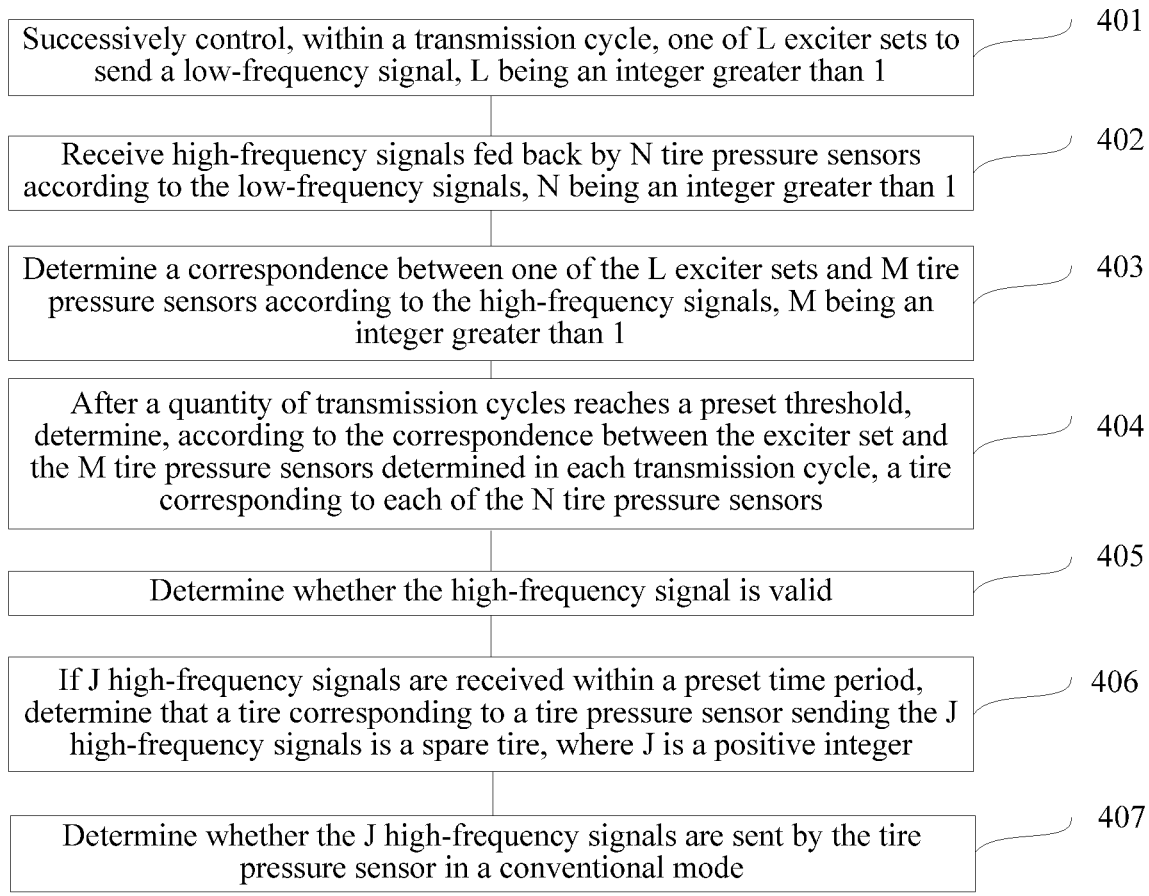
FIG. 4 is a schematic flowchart of a tire positioning method according to another embodiment of the present invention.

FIG. 4 is a schematic flowchart of a tire positioning method according to another embodiment of the present invention. The tire positioning method in this embodiment of the present invention may be performed by the ECU in the foregoing automobile 1, and the method may also be performed by an ECU in other vehicles. No limitation is imposed herein.

Referring to FIG. 4, the tire positioning method includes the following steps.

401: Successively control, within a transmission cycle, one of L exciter sets to send a low-frequency signal, L being an integer greater than 1.

402: Receive high-frequency signals fed back by N tire pressure sensors according to the low-frequency signals, N being an integer greater than 1.

Step 401 in this embodiment of the present invention is similar to step 201 in the foregoing embodiment, and step 402 is similar to step 202 in the foregoing embodiment. Therefore, details are not described herein again.

403: Determine a correspondence between one of the L exciter sets and M tire pressure sensors according to the high-frequency signals, M being an integer greater than 1.

Specifically, the determining a correspondence between one of the L exciter sets and M tire pressure sensors according to the high-frequency signals includes: determining M high-frequency signals corresponding to the first exciter set in the N high-frequency signals; and determining that the first exciter set corresponds to the M tire pressure sensors sending the M high-frequency signals.

Further, the determining M high-frequency signals corresponding to the first exciter set in the N high-frequency signals includes: determining whether a byte related to the first low-frequency signal in the high-frequency signal has changed; and if the byte related to the first low-frequency signal in the high-frequency signal has changed, determining that the high-frequency signal corresponds to the first exciter set.

In addition, a specific implementation of determining the M high-frequency signals corresponding to the first exciter set in the N high-frequency signals is similar to step 203 in the foregoing embodiment, and details are not described herein again.

404: After a quantity of transmission cycles reaches a preset threshold, determine, according to the correspondence between the exciter set and the M tire pressure sensors determined in each transmission cycle, a tire corresponding to each of the N tire pressure sensors.

405: Determined whether the high-frequency signal is valid.

During tire positioning, to ensure validity of the high-frequency signal, it needs to be determined whether the high-frequency signal is valid. The determining whether the high-frequency signal is valid includes: determining, according to the high-frequency signal, a quantity of frames of the first low-frequency signal latest received by the tire pressure sensor sending the high-frequency signal; determining whether a ratio of the quantity of received frames to a quantity of sent frames of the first low-frequency signal is greater than or equal to a preset ratio threshold; and if the ratio of the quantity of received frames to the quantity of sent frames of the first low-frequency signal is greater than or equal to the preset ratio threshold, determining that the high-frequency signal is valid. The ratio threshold may be set based on communication transmission loss or customized by a user based on experience. For example, the ratio threshold is set to 0.5. A quantity of sent frames of the first low-frequency signal is set to N1, and a quantity of frames of the first low-frequency signal actually received by the tire pressure sensor is Nc. When Nc≥N1*0.5, the high-frequency signal is valid, that is, a success rate of receiving the low-frequency signal is greater than or equal to 50%, and the high-frequency signal is valid.

In this embodiment of the present invention, based on step 405, where the determining whether a byte related to the first low-frequency signal in the high-frequency signal has changed in step 403 specifically includes: if the high-frequency signal is valid, determining whether the byte related to the first low-frequency signal in the high-frequency signal has changed. In other words, only when the high-frequency signal is valid, it can be determined that the high-frequency signal corresponds to the first exciter set based on whether the byte related to the first low-frequency signal in the high-frequency signal has changed, thereby further ensuring accuracy of tire positioning.

406: If J high-frequency signals are received within a preset time period, determine that a tire corresponding to a tire pressure sensor sending the J high-frequency signals is a spare tire, where J is a positive integer.

After the successively controlling, within a transmission cycle, one of L exciter sets to send a low-frequency signal, if the J high-frequency signals are received within the preset time period, it is determined that the tire corresponding to a tire pressure sensor sending the J high-frequency signals is a spare tire. The preset time period tp is greater than a transmission cycle Tp, for example, Tp≤⅔tp, that is, to ensure that a high-frequency signal sent by a tire pressure sensor built in the spare tire can be received by an ECU even if there is positioning interaction in which a tire pressure sensor feeds back a high-frequency signal based on the low-frequency signal. Within the preset time period tp, the tire pressure sensor sends a plurality of high-frequency signals, and there is a random time interval between sending of high-frequency signal. As long as the ECU receives the J high-frequency signals, it may be determined that the tire corresponding to the tire pressure sensor sending the J high-frequency signals is a spare tire.

407: Determine whether the J high-frequency signals are sent by the tire pressure sensor in a conventional mode.

Because the tire pressure sensor built in the spare tire cannot receive the low-frequency signal due to shielding by metal such as a trunk, and the tire pressure sensor in this embodiment of the present invention switches to an active mode after receiving a second low-frequency signal LF2 and does not send data in the conventional mode within a preset time period tp. Therefore, the ECU needs to determine whether the J high-frequency signals are sent by the tire pressure sensor in the conventional mode, so as to position the spare tire. In other words, based on step 407, the determining that a tire corresponding to a tire pressure sensor sending the J high-frequency signals is a spare tire in step 406 includes: if the J high-frequency signals are sent by the tire pressure sensor in the conventional mode, determining that the tire corresponding to the tire pressure sensor sending the J high-frequency signals is a spare tire.

It may be understood that, in some other embodiments, steps 405 to 407 may not be required in different embodiments. In addition, according to the description of the embodiments of the present invention, a person of ordinary skill in the art may understand that in different embodiments, if there is no contradiction, steps 401 to 407 may be performed in different orders.

It should be further noted that, for technical details not described in detail in steps 401 to 407 in this embodiment of the present invention, reference may be made to the specific descriptions of the foregoing embodiments.

In this embodiment of the present invention, the correspondence between one of the L exciter sets and the M tire pressure sensors is determined through the high-frequency signal. Based on the correspondence between the exciter sets and the M tire pressure sensors determined in each transmission cycle, and because a correspondence between an exciter in each of the L exciter sets and a tire is predetermined, the tire corresponding to each of the N tire pressure sensors is determined to complete tire positioning, thereby improving positioning efficiency and accuracy. In addition, during the tire positioning, neither an additional communication device nor manpower is required to enter an identification code of the tire pressure sensor corresponding to the tire.

Embodiment 3

Figure 5:
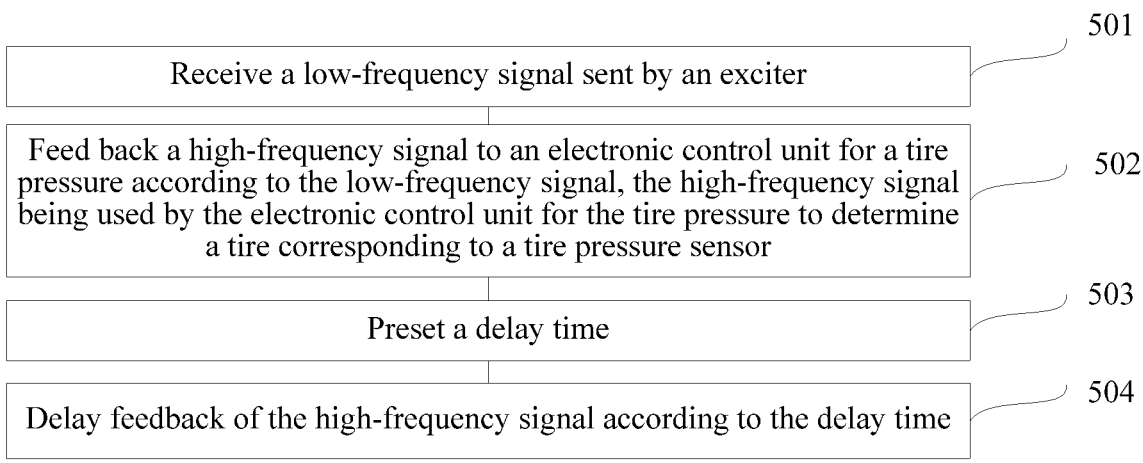
FIG. 5 is a schematic flowchart of a tire positioning method according to another embodiment of the present invention.

FIG. 5 is a schematic flowchart of a tire positioning method according to another embodiment of the present invention. The tire positioning method in this embodiment of the present invention may be performed by the tire pressure sensor in the foregoing automobile 1, and the method may also be performed by a tire pressure sensor in other vehicles. No limitation is imposed herein.

Referring to FIG. 5, the tire positioning method includes the following steps.

501: Receive a low-frequency signal sent by an exciter.

Tire pressure sensors built in the left front, right front, left rear and right rear tires can all receive a low-frequency signal sent by an exciter. Specifically, the tire pressure sensor receives a first low-frequency signal LF1 or a second excitation signal LF2 sent by one of L exciter sets in a transmission cycle under successive control by an ECU for a tire pressure. In addition, the low-frequency signal in step 501 in this embodiment of the present invention is similar to the low-frequency signal in step 201 in the foregoing embodiment. Therefore, details are not described herein again.

502: Feed back a high-frequency signal to an ECU for a tire pressure according to the low-frequency signal, the high-frequency signal being used by the ECU for the tire pressure to determine a tire corresponding to a tire pressure sensor.

For the LF1, the tire pressure sensor merely counts a quantity of received frames of a signal, and does not feed back a high-frequency signal. For the LF2, the tire pressure sensor feeds back a high-frequency signal so that the left front, right front, left rear and right rear tires are positioned. The tire pressure sensors built in the left front, right front, left rear and right rear tires feed back high-frequency signals to the ECU according to the low-frequency signal, so that the ECU can determine a correspondence between one of the L exciter sets and the M tire pressure sensors according to the high-frequency signals, M being an integer greater than 1. Further, after a quantity of transmission cycles reaches a preset threshold, the ECU determines a tire corresponding to each tire pressure sensor according to the correspondence between the exciter set and the M tire pressure sensors determined in each transmission cycle, that is, completes tire positioning.

In addition, a specific implementation in which the high-frequency signal in step 502 in this embodiment of the present invention used by the ECU for the tire pressure to determine the tire corresponding to the tire pressure sensor is similar to the determining of the tire pressure sensor through steps 202 to 204 in the foregoing embodiment. Therefore, details are not described herein again.

503: Preset a delay time.

In this embodiment of the present invention, the delay time is a duration between a moment at which the tire pressure sensor receives the second low-frequency signal LF2 and a moment at which the tire pressure sensor sends a high-frequency signal. The delay time may be set based on a preset sending mechanism. The preset sending mechanism may be determined based on a quantity of frames of the first low-frequency signal received by the tire pressure sensor. For example, the preset sending mechanism is: Delay time Td=Tx+Rx. Td is a delay between a moment at which the tire pressure sensor receives the LF2 and a moment at which the tire pressure sensor sends the first high-frequency signal. Tx is an accumulative quantity of frames of first low-frequency signal LF1 received by the corresponding tire pressure sensor. Rx is a number randomly generated in the system. For example, an accumulative quantity of frames of the first low-frequency signal LF1 received by the tire pressure sensor built in the left front tire is 20, and an accumulative quantity of frames of the first low-frequency signal LF1 received by the tire pressure sensor built in the right front tire is 30. In this case, a delay time corresponding to the tire pressure sensor built in the left front tire is 20+Rx; and a delay time corresponding to the tire pressure sensor built in the right front tire is 30+Rx.

504: Delay feedback of the high-frequency signal according to the delay time.

Because one exciter set sends low-frequency signals synchronously, if the tire pressure sensor does not delay feedback of the high-frequency signal after receiving the low-frequency signal, high-frequency signals sent by the tire pressure sensor at a same side may overlap, that is, high-frequency signals received by the ECU from the two tire pressure sensors at a same side overlap. Therefore, feedback of the high-frequency signal needs to be delayed according to the delay time to avoid overlapping. For example, after the exciter set with the front attribute sends the second low-frequency signal, the tire pressure sensor built in the left front tire feeds back the high-frequency signal after a duration of 20+Rx. The tire pressure sensor built in the right front tire feeds back the high-frequency signal after a duration of 30+Rx to avoid overlapping.

It should be noted that, for technical details not described in detail in steps 501 to 504 in this embodiment of the present invention, reference may be made to the specific descriptions of the foregoing embodiments.

It may be understood that, in some other embodiments, steps 503 to 504 may not be required in different embodiments. In addition, according to the description of the embodiments of the present invention, those skilled in the art may understand that in different embodiments, if there is no contradiction, steps 501 to 504 may be performed in different orders.

In this embodiment of the present invention, the tire pressure sensor feeds back the high-frequency signal to the ECU for the tire pressure according to the low-frequency signal, so that the ECU for the tire pressure can determine the tire corresponding to the tire pressure sensor according to the high-frequency signal, thereby completing the tire positioning. According to the tire positioning method, positioning efficiency and accuracy can be determined. In addition, during tire positioning, neither an additional communication device nor manpower is required to enter an identification code of a tire pressure sensor corresponding to a tire.

Embodiment 4

Figure 6:
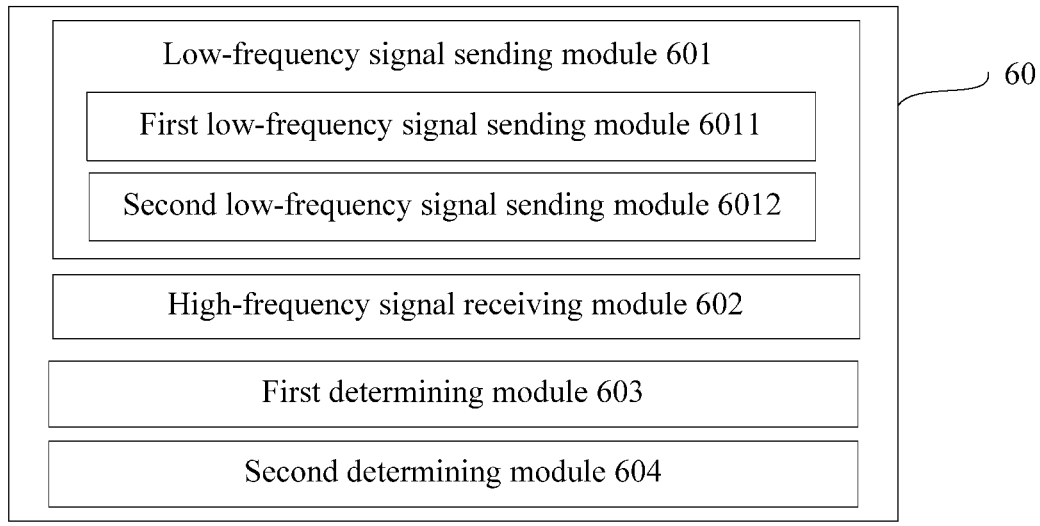
FIG. 6 is a schematic diagram of a tire positioning apparatus according to an embodiment of the present invention.

FIG. 6 is a schematic diagram of a tire positioning apparatus according to an embodiment of the present invention. The tire positioning apparatus in this embodiment of the present invention may be configured in the ECU in the foregoing automobile 1, and the apparatus may also be configured in an ECU in other vehicles. No limitation is imposed herein.

Referring to FIG. 6, the tire positioning apparatus 60 includes:

A low-frequency signal sending module 601, configured to successively control, within a transmission cycle, one of L exciter sets to send a low-frequency signal, L being an integer greater than 1.

One exciter set includes at least two exciters with a same position attribute. The position attribute is used to indicate a relative position at which the exciter is installed. The low-frequency signal is a first low-frequency signal or a second low-frequency signal. The low-frequency signal sending module 601 includes: a first low-frequency signal sending module 6011, configured to control, within the transmission cycle, a first exciter set to send a first low-frequency signal; a second low-frequency signal sending module 6012, configured to control L−1 exciter sets to send a second low-frequency signal. The L−1 exciter sets include N exciters. The second low-frequency signal is used to trigger the tire pressure sensor to switch to an active mode, so that a tire pressure sensor can feed back a high-frequency signal according to the low-frequency signal. In addition, position attributes of the first exciter sets within each transmission cycle are different.

In some embodiments, to reduce unnecessary power consumption, a condition for triggering sending of the low-frequency signal may be set. Specifically, the low-frequency signal sending module 601 is specifically configured to: when a trigger condition is met, successively control, within the transmission cycle, the one of the L exciter sets to send the low-frequency signal. The trigger condition includes the following: a detected driving speed of a vehicle (such as an automobile) is greater than or equal to a preset speed threshold, where the preset speed threshold may be set according to a driving habit of a user; or a detected stopping duration of a vehicle is greater than or equal to a preset time threshold, where the preset time threshold may be set according to a driving habit of a user, and detection needs to be performed only once a day; or a trigger signal input by a user is detected. During transposition of a tire pressure sensor or a tire, the trigger signal input by the user can be detected in real time.

A high-frequency signal receiving module 602, configured to receive high-frequency signals fed back by N tire pressure sensors according to the low-frequency signals, N being an integer greater than 1.

For a first low-frequency signal LF1, the tire pressure sensor merely counts a quantity of received frames of a signal, and does not feed back the high-frequency signal. For a second low-frequency signal LF2, the tire pressure sensor will be triggered to switch to the active mode, so that the tire pressure sensor returns data in a specific format to generate a high-frequency signal, and then sends the high-frequency signal to the high-frequency signal receiving module 602. Therefore, the high-frequency signal receiving module 602 is specifically configured to: receive N high-frequency signals fed back by the N tire pressure sensors in an active state.

A first determining module 603, configured to determine a correspondence between one of the L exciter sets and M tire pressure sensors according to the high-frequency signals, M being an integer greater than 1.

The first determining module 603 is specifically configured to: determine M high-frequency signals corresponding to the first exciter set in the N high-frequency signals; and determine that the first exciter set corresponds to the M tire pressure sensors sending the M high-frequency signals.

Further, that the first determining module 603 determines M high-frequency signals corresponding to the first exciter set in the N high-frequency signals includes: determining whether a byte related to the first low-frequency signal in the high-frequency signal has changed; and if the byte related to the first low-frequency signal in the high-frequency signal has changed, determining that the high-frequency signal corresponds to the first exciter set. The byte is used to accumulate a quantity of received frames of the first low-frequency signal received by the tire pressure sensor.

A second determining module 604, configured to: after a quantity of transmission cycles reaches a preset threshold, determine a tire corresponding to each of the N tire pressure sensors according to the correspondence between an exciter set and the M tire pressure sensors determined in each transmission cycle.

During positioning of the left front, right front, left rear and right rear tires, as long as three tires in the left front, right front, left rear and right rear tires are determined, the remaining one is obviously also determined. Therefore, to improve positioning efficiency, for the automobile in FIG. 1, when the second determining module 604 detects that a quantity of the transmission cycles reaches 3, the second determining module 604 may determine a tire corresponding to each of the N tire pressure sensors according to the correspondence between the exciter set and the M tire pressure sensors determined in each transmission cycle, thereby completing tire positioning, that is, determining a tire to which received information of a tire pressure sensor belongs. For example, first, a transmission cycle of the exciter set with the left attribute as the first exciter set is used for implementing left tire positioning. Then a transmission cycle of the exciter set with the right attribute as the first exciter set is used for implementing right tire positioning. Finally, a transmission cycle of the exciter set with the front attribute as the first exciter set is used for implementing front tire positioning, thereby implementing positioning of the left front, right front, left rear and right rear tires.

In some embodiments, to further improve the positioning efficiency, when the second determining module 604 detects that the quantity of the transmission cycles reaches 2, the second determining module 604 determines the tire corresponding to each of the N tire pressure sensors according to the correspondence between the exciter set and the M tire pressure sensors determined in each transmission cycle, thereby implementing tire positioning. First, a transmission cycle of the exciter set with the left attribute as the first exciter set is used for implementing left tire positioning. Then a transmission cycle of the exciter set with the front attribute as the first exciter set is used for implementing front tire positioning. A temperature byte of the left front tire changes in both of the two transmission cycles. A temperature byte of the left rear tire changes in a first transmission cycle but does not change in a second transmission cycle. A temperature byte of the right front tire does not change in the first transmission cycle but changes in the second transmission cycle. A temperature byte of the right rear tire changes in neither of the two transmission cycles. Thus, positioning of the left front, right front, left rear and right rear tires is completed.

It should be noted that, in this embodiment of the present invention, the tire positioning apparatus 60 may perform the tire positioning method provided in Embodiment 1 of the present invention, and has corresponding functional modules to perform the method and beneficial effects thereof. For technical details not described in the embodiment of the tire positioning apparatus 60, reference may be made to the tire positioning method provided in Embodiment 1 of the present invention.

Embodiment 5

Figure 7:
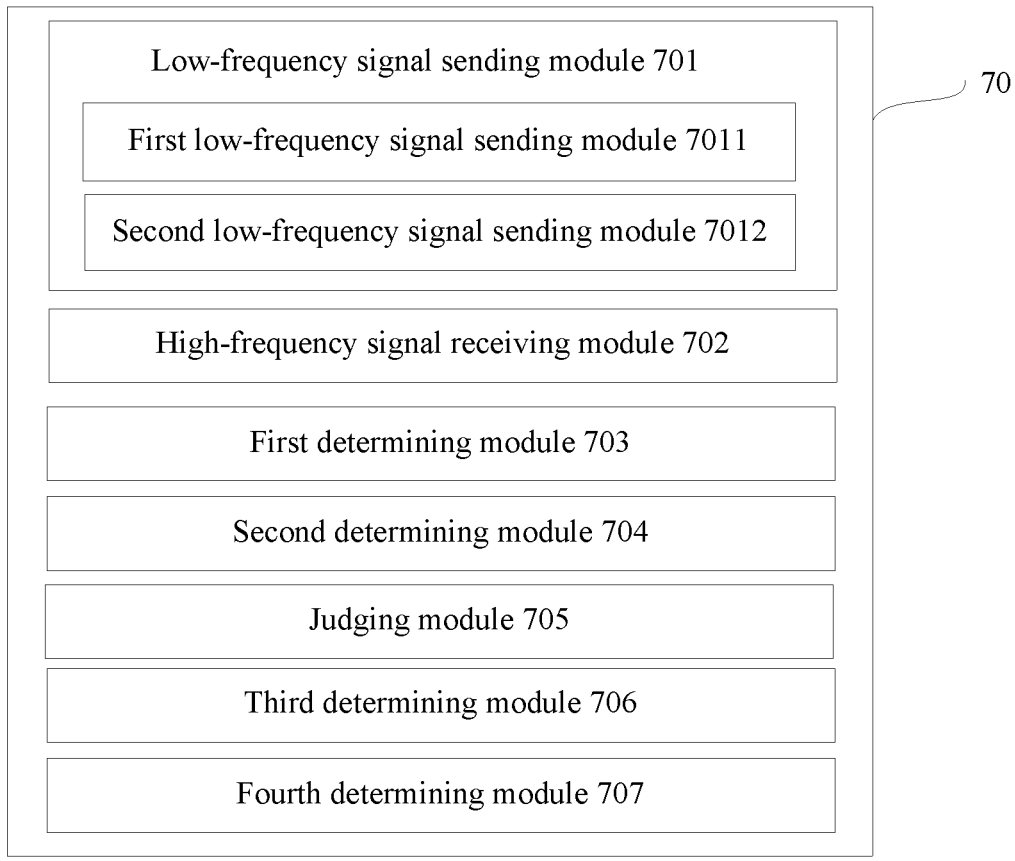
FIG. 7 is a schematic diagram of a tire positioning apparatus according to another embodiment of the present invention.

FIG. 7 is a schematic diagram of a tire positioning apparatus according to another embodiment of the present invention. The tire positioning apparatus in this embodiment of the present invention may be configured in the ECU in the foregoing automobile 1, and the apparatus may also be configured in an ECU in other vehicles. No limitation is imposed herein.

Referring to FIG. 7, the tire positioning apparatus 70 includes:

A low-frequency signal sending module 701, configured to successively control, within a transmission cycle, one of L exciter sets to send a low-frequency signal, L being an integer greater than 1.

The low-frequency signal may include a first low-frequency signal or a second low-frequency signal. The low-frequency signal sending module 701 includes: a first low-frequency signal sending module 7011, configured to control, within the transmission cycle, a first exciter set to send a first low-frequency signal; a second low-frequency signal sending module 7012, configured to control L−1 exciter sets to send a second low-frequency signal. The L−1 exciter sets include N exciters. The second low-frequency signal is used to trigger the tire pressure sensor to switch to an active mode, so that a tire pressure sensor can feed back a high-frequency signal according to the low-frequency signal. In addition, position attributes of the first exciter sets within each transmission cycle are different.

A high-frequency signal receiving module 702, configured to receive high-frequency signals fed back by N tire pressure sensors according to the low-frequency signals, N being an integer greater than 1.

A first determining module 703, configured to determine a correspondence between one of the L exciter sets and M tire pressure sensors according to the high-frequency signals, M being an integer greater than 1.

The first determining module 703 is specifically configured to: determine M high-frequency signals corresponding to the first exciter set in the N high-frequency signals; and determine that the first exciter set corresponds to the M tire pressure sensors sending the M high-frequency signals.

Further, that the first determining module 703 determines M high-frequency signals corresponding to the first exciter set in the N high-frequency signals includes: determining whether a byte related to the first low-frequency signal in the high-frequency signal has changed; and if the byte related to the first low-frequency signal in the high-frequency signal has changed, determining that the high-frequency signal corresponds to the first exciter set. The byte is used to accumulate a quantity of received frames of the first low-frequency signal received by the tire pressure sensor.

A second determining module 704, configured to: after a quantity of transmission cycles reaches a preset threshold, determine a tire corresponding to each of the N tire pressure sensors according to the correspondence between an exciter set and the M tire pressure sensors determined in each transmission cycle.

A judging module 705, configured to determine whether the high-frequency signal is valid.

During tire positioning, to ensure validity of the high-frequency signal, it needs to be determined whether the high-frequency signal is valid through the judging module 705. The judging module 705 is specifically configured to: determine, according to the high-frequency signal, a quantity of frames of the first low-frequency signal latest received by the tire pressure sensor sending the high-frequency signal; determine whether a ratio of the quantity of received frames to a quantity of sent frames of the first low-frequency signal is greater than or equal to a preset ratio threshold; and if the ratio of the quantity of received frames to the quantity of sent frames of the first low-frequency signal is greater than or equal to the preset ratio threshold, determine that the high-frequency signal is valid. The ratio threshold may be set based on communication transmission loss or customized by a user based on experience.

In this embodiment of the present invention, based on the judging module 705, where the first determining module 703 determines whether a byte related to the first low-frequency signal in the high-frequency signal has changed includes: if the judging module determines that the high-frequency signal is valid, determining whether the byte related to the first low-frequency signal in the high-frequency signal has changed. In other words, only when the judging module 705 determines that high-frequency signal is valid, the first determining module 703 can determine that the high-frequency signal corresponds to the first exciter set based on whether the byte related to the first low-frequency signal in the high-frequency signal has changed, thereby further ensuring accuracy of tire positioning.

A third determining module 706, configured to: if J high-frequency signals are received within a preset time period, determine that a tire corresponding to a tire pressure sensor sending the J high-frequency signals is a spare tire, where J is a positive integer.

After the low-frequency signal sending module 701 successively controls, within a transmission cycle, one of L exciter sets to send a low-frequency signal, if the third determining module 706 receives J high-frequency signals within the preset time period, it is determined that the tire corresponding to a tire pressure sensor sending the J high-frequency signals is a spare tire. The preset time period tp is greater than a transmission cycle Tp, for example, Tp≤⅔tp, that is, to ensure that a high-frequency signal sent by a tire pressure sensor built in the spare tire can be received by the third determining module 706 even if there is positioning interaction in which a tire pressure sensor feeds back a high-frequency signal based on the low-frequency signal. Within the preset time period tp, the tire pressure sensor sends a plurality of high-frequency signals, and there is a random time interval between sending of high-frequency signal. As long as the third determining module 706 receives the J high-frequency signals, it may be determined that the tire corresponding to the tire pressure sensor sending the J high-frequency signals is a spare tire.

A fourth determining module 707, configured to determine whether the J high-frequency signals are sent by the tire pressure sensor in a conventional mode.

Because the tire pressure sensor built in the spare tire cannot receive the low-frequency signal due to shielding by metal such as a trunk, and the tire pressure sensor in this embodiment of the present invention switches to an active mode after receiving a second low-frequency signal LF2 and does not send data in the conventional mode within a preset time period tp. Therefore, it needs to be determined through the fourth determining module 707 whether the J high-frequency signals are sent by the tire pressure sensor in the conventional mode, so as to position the spare tire. In other words, based on the fourth determining module 707, that the third determining module 706 determines that a tire corresponding to a tire pressure sensor sending the J high-frequency signals is a spare tire includes: if the fourth determining module determines that the J high-frequency signals are sent by the tire pressure sensor in the conventional mode, determining, by the third determining module 706, that the tire corresponding to the tire pressure sensor sending the J high-frequency signals is a spare tire.

It should be noted that, in this embodiment of the present invention, the tire positioning apparatus 70 may perform the tire positioning method provided in Embodiment 2 of the present invention, and has corresponding functional modules to perform the method and beneficial effects thereof. For technical details not described in the embodiment of the tire positioning apparatus 70, refer to the tire positioning method provided in Embodiment 2 of the present invention.

Embodiment 6

Figure 8:
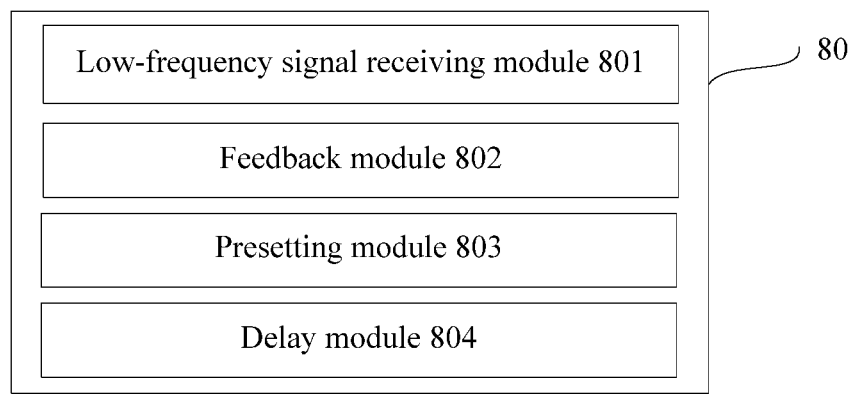
FIG. 8 is a schematic diagram of a tire positioning apparatus according to another embodiment of the present invention.

FIG. 8 is a schematic diagram of a tire positioning apparatus according to another embodiment of the present invention. The tire positioning apparatus in this embodiment of the present invention may be configured in the tire pressure sensor in the foregoing automobile 1, and the apparatus may be further configured in a tire pressure sensor in other vehicles. No limitation is imposed herein.

Referring to FIG. 8, the tire positioning apparatus 80 includes:

A low-frequency signal receiving module 801, configured to receive a low-frequency signal sent by an exciter.

The low-frequency signal receiving module 801 of the tire pressure sensors built in the left front, right front, left rear and right rear tires can all receive the low-frequency signals sent by the exciter. Specifically, the low-frequency signal receiving module 801 receives a first low-frequency signal LF1 or a second excitation signal LF2 sent by one of L exciter sets in a transmission cycle under successive control by an ECU for a tire pressure.

The feedback module 802 is configured to feed back a high-frequency signal to an ECU for a tire pressure according to the low-frequency signal, the high-frequency signal being used by the ECU for the tire pressure to determine a tire corresponding to a tire pressure sensor.

For the LF1, the feedback module 802 merely counts a quantity of received frames of a signal, and does not feed back a high-frequency signal. For the LF2, the feedback module 802 feeds back a high-frequency signal so that the left front, right front, left rear and right rear tires are positioned. The feedback modules 802 of the tire pressure sensors built in the left front, right front, left rear and right rear tires feed back high-frequency signals to the ECU according to the low-frequency signal, so that the ECU can determine a correspondence between one of the L exciter sets and the M tire pressure sensors according to the high-frequency signals, M being an integer greater than 1. Further, after a quantity of transmission cycles reaches a preset threshold, the ECU determines a tire corresponding to each tire pressure sensor according to the correspondence between the exciter set and the M tire pressure sensors determined in each transmission cycle, that is, completes tire positioning.

The presetting module 803 is configured to preset a delay time.

In this embodiment of the present invention, the delay time is a duration between a moment at which the low-frequency signal receiving module 801 receives the second low-frequency signal LF2 and a moment at which the feedback module 802 sends a high-frequency signal. The presetting module 803 may determine a delay time based on a preset sending mechanism. The preset sending mechanism may be determined based on a quantity of frames of the first low-frequency signal received by the tire pressure sensor. For example, the preset sending mechanism is: Delay time Td=Tx+Rx. Td is a delay between a moment at which the low-frequency signal receiving module 801 receives the LF2 and a moment at which the feedback module 802 sends the first high-frequency signal. Tx is an accumulative quantity of frames of first low-frequency signal LF1 received by the corresponding low-frequency signal receiving module 801. Rx is a number randomly generated in the system. For example, an accumulative quantity of frames of the first low-frequency signal LF1 received by the low-frequency signal receiving module 801 of the tire pressure sensor built in the left front tire is 20, and an accumulative quantity of frames of the first low-frequency signal LF1 received by the low-frequency signal receiving module 801 of the tire pressure sensor built in the right front tire is 30. In this case, a delay time corresponding to the tire pressure sensor built in the left front tire is 20+Rx; and a delay time corresponding to the tire pressure sensor built in the right front tire is 30+Rx.

The delay module 804 is configured to delay feedback of the high-frequency signal according to the delay time.

Because one exciter set sends low-frequency signals synchronously, if the low-frequency signal receiving module 801 does not delay feedback of the high-frequency signal through the delay module 804 after receiving the low-frequency signal, high-frequency signals sent by feedback modules 802 of the tire pressure sensor at a same side may overlap, that is, high-frequency signals received by the ECU from feedback modules 802 of the two tire pressure sensors at a same side overlap. Therefore, feedback of the high-frequency signal needs to be delayed through the delay module 804 according to the delay time to avoid overlapping. For example, after the exciter set with the front attribute sends the second low-frequency signal, the feedback module 802 of the tire pressure sensor built in the left front tire feeds back the high-frequency signal after a duration of 20+Rx through the delay module 804. The feedback module 802 of the tire pressure sensor built in the right front tire feeds back the high-frequency signal after a duration of 30+Rx through the delay module 804 to avoid overlapping.

It should be noted that, in this embodiment of the present invention, the tire positioning apparatus 80 may perform the tire positioning method provided in Embodiment 3 of the present invention, and has corresponding functional modules to perform the method and beneficial effects thereof. For technical details not described in the embodiment of the tire positioning apparatus 80, reference may be made to the tire positioning method provided in Embodiment 3 of the present invention.

Embodiment 7

Figure 9:
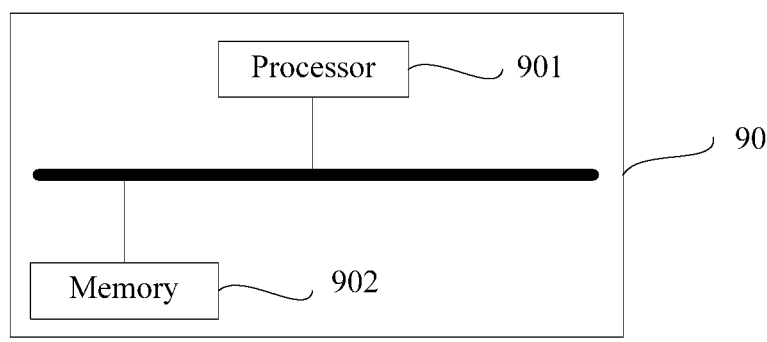
FIG. 9 is a schematic structural diagram of hardware of an ECU according to an embodiment of the present invention.

FIG. 9 is a schematic structural diagram of hardware of an ECU according to an embodiment of the present invention. As shown in FIG. 9, the ECU 90 includes:

one or more processors 901 and a memory 902. One processor 901 is used as an example in FIG. 9.

The processor 901 and the memory 902 may be connected through a bus or in other manners. In FIG. 9, that the processor and the memory are connected through a bus is used as an example.

As a non-volatile computer-readable storage medium, the memory 902 may be configured to store a non-volatile software program, a non-volatile computer executable program and a module, for example, a program instruction/module (for example, the low-frequency signal sending module 701, the high-frequency signal receiving module 702, the first determining module 703, the second determining module 704, the judging module 705, the third determining module 706 and the fourth determining module 707 shown in FIG. 7) corresponding to the tire positioning method provided in Embodiment 2 or Embodiment 3 of the present invention. The processor 901 executes various functional applications and data processing of the ECU by running the non-volatile software program, the instruction and the module stored in the memory 902, that is, implements the tire positioning method provided in Method Embodiment 1 or Method Embodiment 2.

The memory 902 may include a program storage area and a data storage area. The program storage area may store an operating system and an application program required for at least one function. The data storage area may store data created according to use of the ECU, and the like. In addition, the memory 902 may include a high speed random access memory, and may further include a non-volatile memory, such as at least one magnetic disk storage device, a flash memory device or other non-volatile solid state storage devices. In some embodiments, the memory 902 may optionally include memories remotely disposed relative to the processor 901, and these remote memories may be connected to the ECU through a network. An embodiment of the network includes but is not limited to, the Internet, an intranet, a local area network, a mobile communication network and a combination thereof.

The one or more modules and instructions are stored in the memory 902. When the one or more modules and instructions are executed by the one or more processors 901, the tire positioning method provided in Embodiment 1 or Embodiment 2 of the present invention is implemented, for example, step 401 to step 407 in the foregoing method in FIG. 4 are performed, or functions of the modules 701 to 707 in FIG. 7 are implemented.

For example, the ECU may further include a communication interface. The communication interface is configured to communicate with other devices, such as a tire pressure sensor. Other apparatuses included in the ECU are not limited herein.

The ECU may perform the tire positioning method provided in Embodiment 1 or Embodiment 2 of the present invention, and has corresponding functional modules to perform the method and beneficial effects thereof. For technical details not described in the embodiment of the ECU, reference may be made to the tire positioning method provided in Embodiment 1 or Embodiment 2 of the present invention.

An embodiment of the present invention provides a computer program product, the computer program product including a computer program stored in a non-volatile computer-readable storage medium. The computer program includes program instructions that, when executed by the ECU, cause the ECU to perform the tire positioning method provided in Embodiment 1 or Embodiment 2 of the present invention. For example, step 401 to step 407 in the foregoing method in FIG. 4 are performed, or functions of the modules 701 to 707 in FIG. 7 are implemented.

An embodiment of the present invention provides a non-volatile computer-readable storage medium. The computer-readable storage medium stores a computer executable instruction, the computer executable instruction being used to cause an ECU to perform the tire positioning method provided in the Embodiment 1 or Embodiment 2 of the present invention. For example, step 401 to step 407 in the foregoing method in FIG. 4 are performed, or functions of the modules 701 to 707 in FIG. 7 are implemented.

Embodiment 8

Figure 10:
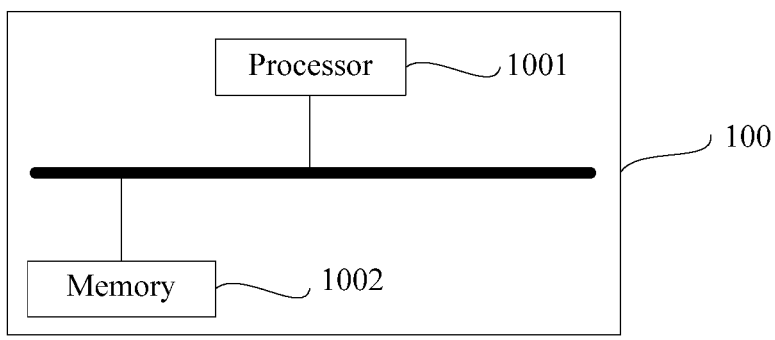
FIG. 10 is a schematic structural diagram of hardware of a tire pressure sensor according to an embodiment of the present invention.

FIG. 10 is a schematic structural diagram of hardware of a tire pressure sensor according to an embodiment of the present invention. As shown in FIG. 10, a tire pressure sensor 100 includes one or more processors 1001 and a memory 1002. One processor 1001 is used as an example in FIG. 10.

The processor 1001 and the memory 1002 may be connected through a bus or in other manners. In FIG. 10, that the processor and the memory are connected through a bus is used as an example.

As a non-volatile computer-readable storage medium, the memory 1002 may be configured to store a non-volatile software program, a non-volatile computer executable program and a module, for example, a program instruction/module (for example, the low-frequency signal receiving module 801, the feedback module 802, the presetting module 803 and the delay module 804 shown in FIG. 8) corresponding to the tire positioning method provided in Embodiment 3 of the present invention. The processor 1001 executes various functional applications and data processing of the tire pressure sensor by running the non-volatile software program, the instruction and the module stored in the memory 1002, that is, implements the tire positioning method provided in Method Embodiment 3.

The memory 1002 may include a program storage area and a data storage area. The program storage area may store an operating system and an application program required for at least one function. The data storage area may store data created according to use of the tire pressure sensor, and the like. In addition, the memory 1002 may include a high speed random access memory, and may further include a non-volatile memory, such as at least one magnetic disk storage device, a flash memory device or other non-volatile solid state storage devices. In some embodiments, the memory 1002 may optionally include memories remotely disposed relative to the processor 1001. The remote memories may be connected to the tire pressure sensor through a network. An embodiment of the network includes but is not limited to, the Internet, an intranet, a local area network, a mobile communication network and a combination thereof.

The one or more modules and instructions are stored in the memory 1002. When the one or more modules and instructions are executed by the one or more processors 1001, the tire positioning method provided in Embodiment 3 of the present invention is implemented, for example, step 501 to step 504 in the foregoing method in FIG. 5 are performed, or functions of the modules 801 to 804 in FIG. 8 are implemented.

For example, the tire pressure sensor may further include a communication interface. The communication interface is configured to communicate with other devices, such as an ECU. Other apparatuses included in the tire pressure sensor are not limited herein.

The tire pressure sensor may perform the tire positioning method provided in Embodiment 3 of the present invention, and has corresponding functional modules to perform the method and beneficial effects thereof. For technical details not described in the embodiment of the tire positioning sensor, reference may be made to the tire positioning method provided in Embodiment 3 of the present invention.

An embodiment of the present invention provides a computer program product, where the computer program product includes a computer program stored in a non-volatile computer-readable storage medium. The computer program includes program instructions that, when executed by the tire pressure sensor, cause the tire pressure sensor to perform the tire positioning method provided in Embodiment 3 of the present invention. For example, step 501 to step 504 in the foregoing method in FIG. 5 are performed, or functions of the modules 801 to 804 in FIG. 8 are implemented.

An embodiment of the present invention provides a non-volatile computer-readable storage medium. The computer-readable storage medium stores a computer executable instruction, the computer executable instruction being used to cause a tire pressure sensor to perform the tire positioning method provided in the Embodiment 3 of the present invention.

For example, step 501 to step 504 in the foregoing method in FIG. 5 are performed, or functions of the modules 801 to 804 in FIG. 8 are implemented.

Embodiment 9

Figure 11:
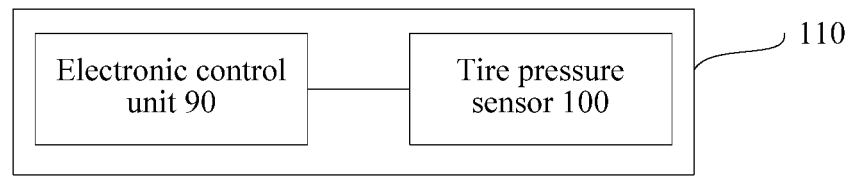
FIG. 11 is a schematic diagram of a tire pressure monitoring system according to an embodiment of the present invention.

FIG. 11 is a schematic diagram of a tire pressure monitoring system according to an embodiment of the present invention. As shown in FIG. 11, the tire pressure monitoring system 110 includes an ECU 90 and a tire pressure sensor 100. The ECU 90 is communicatively connected to the tire pressure sensor 100. The ECU is configured to perform the tire positioning method provided in Embodiment 1 or Embodiment 2 of the present invention. The tire pressure sensor is configured to perform the tire positioning method provided in Embodiment 3 of the present invention.

Through the ECU 90 and the tire pressure sensor 100, the tire pressure monitoring system 110 can achieve high positioning efficiency and high positioning accuracy. In addition, during tire positioning, neither an additional communication device nor manpower is required to enter an identification code of a tire pressure sensor corresponding to a tire. For technical details not described in detail in the embodiment of the tire pressure monitoring system 110, refer to the ECU 90 provided in Embodiment 7 of the present invention and the tire pressure sensor 100 provided in Embodiment 8 of the present invention.

It should be noted that, the apparatus embodiments described above are merely schematic. The modules described as separate parts may be or may not be physically apart. The parts displayed as modules may be or may not be physical modules, in other words, may be located at a same place, or may be distributed onto a plurality of network modules. Some or all modules thereof may be selected based on an actual requirement, to implement an objective of the solution in this embodiment.

Through the description of the foregoing embodiments, a person of ordinary skill in the art may clearly understand that the embodiments may be implemented by software in combination with a universal hardware platform, and may certainly be implemented by hardware. A person of ordinary skill in the art may understand that all or some of the procedures of the methods of the foregoing embodiments may be implemented by a computer program instructing relevant hardware. The computer program may be stored in a computer-readable storage medium, when executed, the program may include the procedures of the embodiments of the foregoing methods. The foregoing storage medium may be a read-only memory (ROM), or a random access memory (RAM) or the like.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:
1. A tire positioning method, comprising:
  successively controlling, within a transmission cycle, one of L exciter sets to send a low-frequency signal, L being an integer greater than 1;
  receiving high-frequency signals fed back by N tire pressure sensors according to the low-frequency signals, N being an integer greater than 1;

determining a correspondence between one of the L exciter sets and M tire pressure sensors according to the high-frequency signals, M being an integer greater than 1; and after a quantity of transmission cycles reaches a preset threshold, determining a tire corresponding to each of the N tire pressure sensors according to the correspondence between the exciter set and the M tire pressure sensors determined in each transmission cycle.

2. The method according to claim 1, wherein the successively controlling, within a transmission cycle, one of L exciter sets to send a low-frequency signal comprises:

controlling, within the transmission cycle, a first exciter set to send a first low-frequency signal; and controlling L−1 exciter sets to send a second low-frequency signal, wherein the L−1 exciter sets comprise N exciters; and the second low-frequency signal is used to trigger the tire pressure sensor to switch to an active mode.

3. The method according to claim 2, wherein position attributes of the first exciter sets within each transmission cycle are different; and the position attribute of the first exciter set is determined through a same position attribute of exciters comprised in the first exciter set.

4. The method according to claim 3, wherein the receiving high-frequency signals fed back by N tire pressure sensors according to the low-frequency signals comprises:

receiving N high-frequency signals fed back by the N tire pressure sensors in an active state.

5. The method according to claim 4, wherein the determining a correspondence between one of the L exciter sets and M tire pressure sensors according to the high-frequency signals comprises:

determining M high-frequency signals corresponding to the first exciter set in the N high-frequency signals; and determining that the first exciter set corresponds to the M tire pressure sensors sending the M high-frequency signals.

6. The method according to claim 5, wherein the determining M high-frequency signals corresponding to the first exciter set in the N high-frequency signals comprises:

determining whether a byte related to the first low-frequency signal in the high-frequency signal has changed; and if the byte related to the first low-frequency signal in the high-frequency signal has changed, determining that the high-frequency signal corresponds to the first exciter set.

7. The method according to claim 6, wherein the byte is used to accumulate a quantity of received frames of the first low-frequency signal received by the tire pressure sensor.

8. The method according to claim 7, further comprising:
determining whether the high-frequency signal is valid, wherein the determining whether a byte related to the first low-frequency signal in the high-frequency signal has changed comprises:

if the high-frequency signal is valid, determining whether the byte related to the first low-frequency signal in the high-frequency signal has changed.

9. The method according to claim 8, wherein the determining whether the high-frequency signal is valid comprises:

determining, according to the high-frequency signal, a quantity of frames of the first low-frequency signal latest received by the tire pressure sensor sending the high-frequency signal;

determining whether a ratio of the quantity of received frames to a quantity of sent frames of the first low-frequency signal is greater than or equal to a preset ratio threshold; and if the ratio of the quantity of received frames to the quantity of sent frames of the first low-frequency signal is greater than or equal to the preset ratio threshold, determining that the high-frequency signal is valid.

10. The method according to claim 1, wherein the successively controlling, within a transmission cycle, one of L exciter sets to send a low-frequency signal comprises:

when a trigger condition is met, successively controlling, within the transmission cycle, the one of the L exciter sets to send the low-frequency signal.

11. The method according to claim 10, wherein the trigger condition comprises the following:

a detected driving speed of a vehicle is greater than or equal to a preset speed threshold; or a detected stopping duration of a vehicle is greater than or equal to a preset time threshold; or a trigger signal input by a user is detected.

12. The method according to claim 1 wherein after the successively controlling, within a transmission cycle, one of L exciter sets to send a low-frequency signal, the method further comprises:

if J high-frequency signals are received within a preset time period, determining that a tire corresponding to a tire pressure sensor sending the J high-frequency signals is a spare tire, wherein J is a positive integer.

13. The method according to claim 12, further comprising:

determining whether the J high-frequency signals are sent by the tire pressure sensor in a conventional mode, wherein the determining that a tire corresponding to a tire pressure sensor sending the J high-frequency signals is a spare tire comprises:

if the J high-frequency signals are sent by the tire pressure sensor in the conventional mode, determining that the tire corresponding to the tire pressure sensor sending the J high-frequency signals is a spare tire.

14. An electronic control unit (ECU), comprising:
at least one processor; and
a memory, communicatively connected to the at least one processor, wherein
the memory stores an instruction executable by the at least one processor; and
the at least one processor is configured to execute the instruction to implement the method according to claim 1.

* * * * *